United States Patent Office 2,845,326
Patented July 29, 1958

2,845,326

DIAZOTIZABLE AMINE COMPOSITIONS

Clemens Streck, Loudonville, N. Y., assignor to General Aniline & Film Corporation, New York, N. Y., a corporation of Delaware No Drawing. Application August 8, 1955
Serial No. 527,175

18 Claims. (Cl. 8—46)

This invention relates to diazotizable amine compositions, and more particularly to the provision of a stable dispersion of a diazotizable primary amine, which dispersion upon acidification reacts to form a solution of a diazonium compound capable of coupling with an azo coupling component to form an azo dyestuff.

In the well known art of dyeing and printing fibers with ice colors, otherwise known as azoic dyeing and printing, or in the preparation of azo dyestuffs devoid of solubilizing groups, the general practice is to prepare a dilute solution or suspension of a diazotizable primary amine compound devoid of solubilizing groups in water containing a considerable excess of mineral acid. The diazotizable primary amine is then diazotized at a low temperature such as 0° to 5° C. by adding a suitable amount of an alkali metal nitrite. The concentration and pH of the resulting solution of the diazo compound is then generally adjusted and employed for reaction with an ice color coupling component to produce the desired azo dyestuff in situ on the fiber or on a carrier or substratum or the like. This procedure requires skill and time and often causes difficulties for the dyer or printer as well as unsatisfactory results. Because of the substantial insolubility of the diazotizable amines in water and dilute mineral acids, difficulty is encountered in producing a solution or suspension of the amine base of as high a concentration as is ordinarily desired for complete and rapid diazotization. Proper calculations and measurements and proper weighing or measuring, reaction, and cooling equipment is required. It has been proposed to supply the dyer with diazonium salts, some few of which are sufficiently stable, but most of which are stabilized as double salts, such as those of zinc chloride, cadmium chloride, tin chloride, fluoroborates, etc., or as aryl sulfonates, such as those of naphthalene mono-, di- and tri-sulfonic acids. These and other proposals have not been entirely satisfactory for various reasons including a certain degree of instability, difficulty in diazotization, concentrations not as high as could be desired, tendencies to tar or foam on dyeing, and the like.

It is an object of this invention to provide a stable dispersion containing a diazotizable primary amine devoid of solubilizing groups, which dispersion upon acidification reacts to form an aqueous solution of the diazo compound of said amine. Other objects and advantages will appear as the description proceeds.

The above objects are attained by the instant invention which is based upon the provision of a composition having a pH of at least about 7 comprising, by weight, about 10 to 30 percent of a diazotizable primary amine compound devoid of solubilizing groups, an alkali metal nitrite in at least an equimolar amount relative to said amine compound, about 10 to 50 percent of a mixture of a non-ionic surface active agent containing a polyoxyalkylene chain and derived from a reactive hydrogen-containing compound, and a water-soluble cationic surface active quaternary ammonium compound, said mixture containing about 0.2 to 1 part of said cationic compound for each part of said non-ionic agent, an amount of an inert, organic, water-miscible, solvent for said amine compound sufficient to yield a substantially stable liquid dispersion, and an amount of water sufficient to keep said nitrite in solution or stable dispersion. It has been found that such dispersion is substantially clear and stable during storage, diazotizes rapidly and without formation of undesirable by-products on acidification, and yields diazo solutions which form a minimum of tar or foam during dyeing. The use of the cationic compound has been found necessary and essential in conjunction with the non-ionic agent for increasing the stability, quality and rate of dispersion and the rate of diazotization, and for reducing undesirable foaming in the dyebath.

The diazotizable primary amines operative in the compositions of the instant invention are those generally employed in producing azoic dyestuffs, namely aromatic and heterocyclic primary amines which are devoid of solubilizing groups such as carboxylic and sulfonic acid groups. As examples of such amines there may be mentioned aminoazotoluene, 4-chloro-2-nitroaniline, 5-chloro-o-toluidine, 4-nitro-o-toluidine, 2,5-dichloroaniline, 4-amino-m-anisidine, 4-nitro-o-anisidine, 4-chloro-o-anisidine, 1-aminonaphthalene, 1-aminoanthraquinone, dianisidine, 5-chloro-4-nitro-o-anisidine, aminobenzophenones, aminosulfones such as aminobenzosulfones and aminodiphenyl sulfones, aminodiphenyl ethers, aminocarbazoles, m-phenylenediamine, 3,3'-diaminodiphenyl-urea, 3,4-diaminobenzanilide and other similar cyclic compounds containing at least one diazotizable primary amine group.

As stated above, the composition contains an alkali metal nitrite such as sodium nitrite or potassium nitrite in at least an equimolar amount relative to the diazotizable amine compound and, if desired when the diazotizable amine compound contains more than one diazotizable primary amine group, such an amount multiplied by the number of such primary amine groups.

The non-ionic surface active agents operative in the compositions of the instant invention are well known in the art. They are generally produced by introducing into a water-insoluble organic compound containing at least one reactive hydrogen atom, a polyglycol radical having at least two oxyalkylene groups. As initial materials may be mentioned water-insoluble carboxylic and sulfonic acids, alcohols, thiols, phenols, hydroxycarboxylic acids, carboxylic and sulfonic acid amides, amines containing at least one reactive hydrogen atom, hydroxyalkylamines, and the like. Those preferred are the higher fatty acids.

Specific examples of reactive hydrogen-containing compounds include mono- or polycarboxylic acids of from 6 to 30 carbon atoms, such as caproic, lauric, palmitic, stearic, oleic, ricinoleic, montanic, abietic and naphthenic acids and mixtures of same, or those produced from waxes and oils or by oxidation of petroleum fractions. Instead of the free acids their esters with polyhydric alcohols may be used, such as their glycerides. Alcohols include those containing at least six carbon atoms, such as hexyl, octyl, dodecyl, octadecyl, oleyl, octadecanediol, abietyl alcohol and alcohol ethers of polyhydric alcohols such as glycerol, and those multi-branched chain primary aliphatic alcohols produced by the Oxo process, such as the Oxo tridecyl alcohol produced from triisobutylene or tetrapropylene. Water insoluble phenols and naphthols may be used. Amines include decyl, octadecyl, dioctyl, dibutyl, diphenyl, N-cyclohexyl-N-mono- or di-alkylol amines, rosin amines and the like. The amides which are usable are generally those produced from the acids listed above. Such compounds, including their conversion into the polyglycol-containing non-ionic surface active agent, by treatment with ethylene oxide, propylene oxide and the like, or substances forming the same, such as halogen hydrins, are described more fully in U. S. Patent 1,970,578.

There may also be used polyoxyalkylene derivatives of organic mercapto compounds such as the products described in U. S. Patent 2,205,021, i. e., the polyoxyalkylene derivatives of such mercapto compounds as dodecyl mercaptan, oleyl mercaptan, cetyl mercaptan, decyl mercaptan and thiophenols, thionaphthols, benzomercaptan, and the like. Also, the polyoxyalkylene derivatives of carboxylic acid amides, described in U. S. Patent 2,085,706, of sulfonamides, described in U. S. Patent 2,002,613, or of sulfonic acids, described in U. S. Patent 2,266,141 may be employed if desired. Similarly, the surface active polyoxyalkylene derivatives disclosed in U. S. Patent 2,677,700 may also be employed in the instant invention. Numerous polyoxyalkylenated phenolic compounds containing one or more alkyl substituents are also disclosed in U. S. Patents 2,213,477 and 2,593,112, those preferred being polyoxyalkylene derivatives of alkyl phenolic compounds in which the total number of alkyl carbon atoms is between 4 and 20.

As described in the aforementioned patents, the organic compound containing a reactive hydrogen atom, and usually at least 6 carbon atoms, is reacted in known manner with a suitable ethylene glycol, halohydrin or with the required number of moles of alkylene oxide to produce the non-ionic surface active agents employed in the instant invention. Since the reaction is substantially quantitative, the molecular proportions of oxyalkylenating agent and reactive hydrogen containing compound employed determine the average oxyalkylene chain length of the resulting surface active agent, although it will be understood that the product is a mixture of derivatives of varying oxyalkylene chain length. The optimum oxyalkylene chain length will in any particular instance be determined mainly by the particular compound being oxyalkylated, the maintenance of a proper balance usually requiring increased amounts of alkylene oxide with higher molecular weight reactants, the other components of the compositions of the instant invention, the hardness of the water employed for acidification (diazotization) and dyeing, and the like.

In general, these non-ionic surface active agents may be represented by the formula

$$R-(OCH_2\overset{A}{C}H)_n-OH$$

wherein R is the residue of an organic compound containing at least 6 carbon atoms and a reactive hydrogen atom; A is hydrogen or lower alkyl such as methyl, ethyl or the like; and $n$ represents the number of oxyalkylene groups sufficient to render the resulting polyoxyalkylenated derivative readily water-dispersible, preferably water soluble. This value may range from about 2 to 100.

The water-soluble cationic surface active quaternary ammonium compounds operative in the instant invention are also well known in the art, being generally quaternary ammonium compounds containing at least one high molecular weight radical of at least 8 carbon atoms bonded to the nitrogen atom, and an anion. They may accordingly be represented by the formula

wherein $R^1$ is a high molecular weight radical of at least 8 carbon atoms; $R^2$, $R^3$ and $R^4$ are organic radicals; and X is an anion. In this formula, the high molecular weight radical $R^1$ may be saturated or unsaturated and may contain or be interrupted by hetero atoms such as oxygen, sulfur, and nitrogen, aromatic and cycloaliphatic groups, and the like. $R^2$, $R^3$ and $R^4$ are preferably lower molecular weight radicals, although one of them may also be a high molecular weight radical. X in the formula may be hydroxyl, chloride, bromide, iodide, mono-, di- or tribasic phosphate, acetate, formate, lactate, gluconate, sulfate, nitrite, nitrate, cyanide, borate, alkyl sulfate, alkyl or aryl sulfonate, benzoate or the like. As stated above, these compounds are well known and may be produced in known manner, for example by quaternizing a tertiary amine of the formula $NR^1R^2R^3$ by reaction with a compound having the formula $R^4X$. Cationic surface active quaternary ammonium compounds operative in the compositions of the instant invention, and their methods of production are disclosed in the prior art, including U. S. Patents 1,883,042, 2,060,850, 2,086,585, 2,087,131, 2,087,132, 2,108,765, 2,127,476, 2,129,264, 2,137,314, 2,214,352, 2,309,592 and 2,374,213.

The preferred quaternary ammonium compounds for use in the compositions of the instant invention are those wherein $R^1$ is a long chain hydrocarbon radical of from 8 to 18 carbon atoms, as derived for example from cocoanut, palm, soyabean, or castor oil, tallow or the like; $R^2$ and $R^3$ are lower alkyl such as methyl or ethyl, lower alkylol such as ethanol, or polyoxyalkylene alkanol containing up to 5 oxyalkylene, such as oxyethylene, groups and the like; $R^4$ is benzyl or lower alkyl such as methyl or ethyl; and X is chloride. The following quaternary ammonium compounds which may be employed in the instant invention are given for illustrative purposes only: dimethyl-decyl-benzyl-ammonium chloride, diethyl-dodecyl-benzyl-ammonium bromide, trimethyl-dodecyl-ammonium chloride, allyl-dibutyl-dodecyl-ammonium bromide, methyl-diallyl-dodecyl-ammonium iodide, triethyl-dodecyloxymethyl-ammonium chloride, dibenzyl-dihydroxyethyl - dodecyloxymethyl - ammonium chloride, diethyl - benzylthioethyl - dodecyl - ammonium chloride, diethyl - benzyl - dodecylthioethyl - ammonium chloride, dibutyl - allyl - dodecyloxymethyl - ammonium chloride, diethyl-cyclohexyl-dodecyloxymethyl - ammonium chloride, trihydroxyethyl-dodecyl-ammonium chloride, dimethyl-tetradecyl - benzyl - ammonium chloride, diethyl-pentadecyl-benzyl-ammonium bromide, oleyl-ditetraethyleneoxy-ethanol - benzyl - ammonium chloride, oleyl-ditetraethylenoxyethanol-methyl ammonium sulfate, stearyl-hydroxyethyl - ethoxyethanol-benzyl - ammonium chloride, stearyl-dihydroxyethyl-benzyl-ammonium chloride, and the like.

As representative of the inert, organic, water-miscible, solvents for the diazotizable primary amine employed in the instant invention, there may be mentioned amides such as the mono- and di-methyl-, ethyl-, propyl-, isopropyl-, butyl-, and isobutyl-, formamides, acetamides, methoxyacetamides, and glycolamides, ethylene glycol and diethylene glycol and their methyl, ethyl, propyl, and butyl ethers, dimethyl sulfoxide, N-methyl pyrrolidone, methanol, ethanol, isopropyl alcohol and the like, and mixtures thereof.

It will be understood that the term "dispersion" is employed herein in its broad sense to include solutions and stable emulsions and/or suspensions in which the dispersed particles are sufficiently fine to permit rapid dispersion and diazotization upon acidification. This usually requires from about 1 to 3, and preferably about 2 parts of water for each part of alkali metal nitrite. The amount of organic solvent or mixture of solvents necessary for the purposes of the instant invention usually ranges from about 20 to 50 and preferably from about 25 to 40 percent of the composition. Accordingly, the proportions of the components of the compositions of the instant invention are about 10 to 30 percent of the diazotizable primary amine, 10 to 50 percent of a mixture of the non-ionic surface active agent, and the cationic agent, said mixture containing about 0.2 to 1 part of said cationic compound for each part of said non-ionic agent, alkali metal nitrite in an amount at least molecularly equivalent to the amine, 20 to 50 percent of the organic solvent or mixture of organic solvents and about 1 to 3 parts of water for each part of alkali metal nitrite. Preferred proportions are about 15 to 25% of the diazotizable amine compound, 10 to 25% of the non-ionic surface active agent, 2 to 10% of the cationic surface active compound, 5 to 10% of an alkali metal nitrite, 25 to 40% of the organic solvent for said amine compound, and 10 to 20% of water.

In most cases, the pH of the above-described compositions of this invention is at least 7 and on the alkaline side whereby premature generation of nitrous acid from the nitrite is prevented. Accordingly, adjustment of the pH by addition of basic substances is usually unnecessary. It will be understood that other substances which do not substantially alter the desired functions and properties of these compositions may be added thereto without departing from the spirit and scope of the instant invention. The method of mixing the various components of the compositions of the instant invention is not particularly critical. In general, it is preferred to add the diazotizable amine compound to the mixture of organic solvents and surface active agents, with or without heating and, optionally, the water, followed by addition of the alkali metal nitrite either directly or previously dissolved in water.

The compositions of the instant invention are readily susceptible of packing and shipping to the dyer or printer. Upon acidification with an aqueous solution of an acidic substance, preferably but not necessarily at temperatures of about 32 to 80° F., a diazo solution is readily produced which is clear and does not tar or foam on dyeing and which is stable for several hours. Hydrochloric acid is the preferred acidic substance for this purpose, although other such substances may be employed such as formic acid, acetic acid, oxalic acid, lactic acid, tartaric acid, chloroacetic acid, sulfuric acid, phosphoric acid, and the like. Generally, at least 2 and usually about 2½ moles of acid for each mole of diazotizable amine compound may be employed.

The diazo solution is then adjusted, if desired, with respect to pH and/or concentration and may be employed in known manner for reaction with an ice color coupling component. These latter components may be characterized as compounds containing an active methylene group, an enolizable keto group, or an aromatic hydroxy group. Such coupling components generally include the phenols, naphthols, pyrazolones, hydroxybenzofluorenones, benzonaphthols, and various N-substituted amides, which are capable of coupling such as arylides of 3-hydroxy-2-naphthoic acid and its 5,6,7,8-tetrahydro derivative, 3-hydroxy-2-anthroic acid, hydroxycarbazolecarboxylic acid, hydroxybenzocarbazolecarboxylic acid, acetoacetic acid, benzoylacetic acid, furoylacetic acid, terephthaloyl-bis-acetic acid, hydroxydibenzofurancarboxylic acid, hydroxydibenzothiophene carboxylic acid, and the like.

The following examples are illustrative of the instant invention and are not to be regarded as limitative. All parts and proportions mentioned herein, in the examples and in the appended claims are by weight unless otherwise indicated. In the examples, non-ionic agent A is the condensation product of castor oil with about 40 moles of ethylene oxide; cationic agent B is a 50 percent aqueous solution of long chain alkyl dimethyl benzyl ammonium chlorides in which the alkyl groups contain from 8 to 18 carbon atoms with an average 12 to 14 carbon atom content as derived for example from cocoanut oil or the like; and cationic agent C is essentially the condensation product of alkyl amines with about 3 moles of ethylene oxide, quaternized with benzyl chloride, the alkyl groups having about the same composition as those in cationic agent B.

*Example 1*

20 parts o-aminoazotoluene are combined with 15 parts non-ionic agent A, 9 parts cationic agent B, 19.5 parts ethylene glycol monoethyl ether and 20 parts dimethylformamide. To this is added 6.5 parts sodium nitrite dissolved in 10 parts water.

This solution is clear and stable on storage. When added to cold acidified water the diazo is readily produced. Dyeing therewith of cotton treated with an azoic coupling component produced good shades. The dyebath does not foam excessively nor tar.

The compositions illustrated in the following examples are prepared in a manner similar to Example 1.

| | Examples | | | | |
|---|---|---|---|---|---|
| | 2 | 3 | 4 | 5 | 6 |
| o-aminoazotoluene | 20 | 20 | 20 | 20 | 20 |
| Non-Ionic Agent A | 15 | 15 | 15 | 15 | 15 |
| Cationic Agent B | 9 | | 9 | 9 | 9 |
| Cationic Agent C | | 9 | | | |
| ethylene glycol ethyl ether | 19.5 | 19.5 | 22.5 | 22.5 | 22.5 |
| dimethylformamide | 20 | 20 | | | |
| N-methylpyrrolidone | | | 20 | | |
| diethylene glycol ethyl ether | | | | 20 | |
| dimethyl sulfoxide | | | | | 20 |
| sodium nitrite | 6.5 | 6.5 | 6.5 | 6.5 | 6.5 |
| water | 10 | 10 | 7 | 7 | 7 |

To diazotize, 10.5 g. of the above solutions are stirred into 100 cc. cold water containing 2½ cc. HCl 20° Bé. Diazotization is complete within a minute, yielding a diazo solution which forms little or no foam or tar in the dyebath and which is stable on standing for several hours.

| | Examples | | | | |
|---|---|---|---|---|---|
| | 7 | 8 | 9 | 10 | 11 |
| 4-chloro-2-nitro aniline | 20 | 20 | 20 | 20 | 20 |
| Non-Ionic Agent A | 20 | 30 | 30 | 30 | 30 |
| Cationic Agent B | 15 | 10 | 10 | 10 | 10 |
| ethylene glycol ethyl ether | 10 | 23 | 43 | 23 | 23 |
| dimethylformamide | | 20 | | | 20 |
| N-methylpyrrolidone | | | | 20 | |
| diethylene glycol butyl ether | 16.5 | | | | |
| sodium nitrite | 8.5 | 9 | 9 | 9 | 9 |
| water | 10 | 13 | 13 | 13 | 13 |

To diazotize, 8.75 g. of the above solutions are stirred into 40 cc. cold water containing 3.2 cc. HCl 20° Bé. Diazotization is complete within a minute. The solution is diluted to desired volume and neutralized with 14 cc. sodium acetate (10% solution).

*Example 12*

| | Parts |
|---|---|
| 5-chloro-o-toluidine | 20 |
| Non-ionic agent A | 15 |
| Cationic agent B | 10 |
| Diethylene glycol | 19 |
| Ethylene glycol ethyl ether | 24 |
| Sodium nitrite | 10 |
| Water | 12 |

For diazotization, 8 g. of the above solution is stirred into 40 cc. cold water containing 3.12 cc. HCl 20° Bé. Diazotization is complete in a minute. The solution is diluted in desired strength and neutralized with 15 cc. sodium acetate (10% solution). A clear diazo solution is obtained which is stable on standing for several hours and does not foam excessively in the dyebath.

*Example 13*

17.0 parts 4-nitro-o-toluidine
10.0 parts non-ionic agent A
13.0 parts cationic agent B
20.0 parts dimethylformamide
19.5 parts ethylene glycol ethyl ether
8.5 parts sodium nitrite
12.0 parts water To diazotize, 8.0 g. of above solutions are stirred into 32.0 cc. cold water containing 2.88 cc. HCl 20° Bé. Diazotization is complete within one minute. Dilute to volume and neutralize with 14.0 cc. sodium acetate (10% solution). During dyeing a little foam is generated which quickly dissipates.

|  | Examples | |
| --- | --- | --- |
|  | 14 | 15 |
| 4-nitro-o-toluidine | 17.0 | 17.0 |
| Non-Ionic Agent A | 10.0 | 10.0 |
| Cationic Agent B | 13.0 | 13.0 |
| Dimethylformamide |  |  |
| N-methylpyrrolidone | 20.0 | 39.5 |
| Ethylene glycol ethyl ether | 19.5 |  |
| Sodium nitrite | 8.5 | 8.5 |
| Water | 12.0 | 12.0 |

The above compositions are diazotized in the same manner as in Example 13, with similarly improved results.

Example 16

A 100 g. sample of cotton is naphtholated by treatment for 20 minutes in a bath at 85° F. consisting of 2 g. 3-hydroxy-2-naphthoic acid β-naphthanilide
4 cc. alcohol
0.8 cc. caustic soda 34° Bé.
2 cc. water
1 cc. formaldehyde 33%
10 cc. caustic soda 34° Bé.
3 cc. sodium lignin sulfonate
5 cc. sulfonated castor oil
1 g. Nekal BX–76 (sodium alkyl naphthalene sulfonate) and water to make up to 1 liter The material is squeezed and salt rinsed.
An amine solution is made up as follows:

20 g. o-aminoazotoluene
24 cc. dimethylformamide
12 cc. ethylene glycol ethyl ether
21 cc. non-ionic agent A
9 cc. cationic agent B
6.5 g. sodium nitrite
7.5 cc. water 10.5 g. of the amine solution is poured into 50 cc. cold water containing 2.5 cc. HCl 32° Tw. After a few minutes, diazotization is complete and the solution is diluted with water to 1 liter. The naphtholated cotton is immersed in the diazo solution for a few minutes, rinsed and dried. The cotton is dyed a good garnet shade having excellent fastness properties.

This invention has been described with respect to certain preferred embodiments, and various modifications and variations thereof will become obvious to the person skilled in the art. It is to be understood that such modifications and variations are to be included within the spirit and purview of this invention.

I claim:

1. A composition having a pH of at least 7 comprising about 10 to 30 percent of a diazotizable primary amine compound devoid of solubilizing groups, an alkali metal nitrite in at least an equimolar amount relative to said amine compound, about 10 to 50 percent of a mixture of a non-ionic surface active agent containing a polyoxyalkylene chain and derived from a reactive hydrogen-containing compound, and a water-soluble cationic surface active quaternary ammonium compound, said mixture containing about 0.2 to 1 part of said cationic compound for each part of said non-ionic agent, an amount of an inert, organic, water-miscible, solvent for said amine compound sufficient to yield a substantially stable liquid dispersion, and an amount of water sufficient to keep said nitrite in stable dispersion.

2. A composition as defined in claim 1 wherein said non-ionic surface active agent is derived from a long chain fatty acid.

3. A composition as defined in claim 2 wherein said non-ionic surface active agent is the condensation product of castor oil with about 40 moles of ethylene oxide.

4. A composition as defined in claim 3 wherein said quaternary ammonium compound is an alkyl dimethyl benzyl ammonium chloride in which the alkyl group contains from 8 to 18 carbon atoms.

5. A composition as defined in claim 1 wherein said quaternary ammonium compound is an alkyl dimethyl benzyl ammonium chloride in which the alkyl group contains from 8 to 18 carbon atoms.

6. A composition as defined in claim 3 wherein said quaternary ammonium compound is the reaction product of benzyl chloride with the condensation product of an alkyl amine with about 3 moles of ethylene oxide, said alkyl amine containing from 8 to 18 carbon atoms.

7. A composition as defined in claim 1 wherein said quaternary ammonium compound is the reaction product of benzyl chloride with the condensation product of an alkyl amine with about 3 moles of ethylene oxide, said alkyl amine containing from 8 to 18 carbon atoms.

8. A composition as defined in claim 1 wherein said organic solvent comprises dimethyl formamide.

9. A composition as defined in claim 1 wherein said organic solvent comprises N-methyl pyrrolidone.

10. A composition as defined in claim 1 wherein said organic solvent comprises dimethyl sulfoxide.

11. A composition as defined in claim 1 wherein said organic solvent comprises diethylene glycol monobutyl ether.

12. A composition as defined in claim 1 wherein said organic solvent comprises ethylene glycol ethyl ether.

13. A composition as defined in claim 1 wherein said diazotizable amine compound is o-aminoazotoluene.

14. A composition as defined in claim 1 wherein said diazotizable amine compound is 4-chloro-2-nitro-aniline.

15. A composition as defined in claim 1 wherein said diazotizable amine compound is 5-chloro-o-toluidine.

16. A composition as defined in claim 1 wherein said diazotizable amine compound is 4-nitro-o-toluidine.

17. A composition as defined in claim 1 wherein said diazotizable amine compound is 2,5-dichloro-aniline.

18. A composition having a pH of at least 7 comprising about 15 to 25 percent of a diazotizable primary amine compound devoid of solubilizing groups, 10 to 25 percent of a non-ionic surface active agent containing a polyoxyalkylene chain and derived from a reactive hydrogen-containing compound, 2 to 10 percent of a water-soluble cationic surface active quaternary ammonium compound, 5 to 10 percent of an alkali metal nitrite, 25 to 40 percent of an inert, organic, water-miscible solvent for said amine compound, and 10 to 20 percent of water.

References Cited in the file of this patent

UNITED STATES PATENTS

| 2,123,740 | Murphy | July 12, 1938 |
| 2,416,380 | Collie | Feb. 25, 1947 |

FOREIGN PATENTS

| 817,431 | France | May 24, 1937 |

OTHER REFERENCES

Chem. Industries for March 1943, pp. 326, 327.
Amer. Dyestuff Reporter for July 11, 1949, pp. 513–516.